United States Patent
Segawa

(10) Patent No.: US 8,603,940 B2
(45) Date of Patent: Dec. 10, 2013

(54) AUTOMOBILE EXHAUST GAS CATALYTIC CONVERTER

(75) Inventor: Yoshihide Segawa, Kariya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/882,513

(22) PCT Filed: Nov. 2, 2011

(86) PCT No.: PCT/IB2011/002591
§ 371 (c)(1),
(2), (4) Date: Apr. 30, 2013

(87) PCT Pub. No.: WO2012/059808
PCT Pub. Date: May 10, 2012

(65) Prior Publication Data
US 2013/0213000 A1  Aug. 22, 2013

(30) Foreign Application Priority Data
Nov. 5, 2010   (JP) .................... 2010-248233

(51) Int. Cl.
*B01J 23/38* (2006.01)
*B01J 23/46* (2006.01)
*B01D 53/94* (2006.01)
*F01N 3/28* (2006.01)

(52) U.S. Cl.
USPC ............. 502/325; 502/527.12; 423/213.2; 423/213.5; 60/299

(58) Field of Classification Search
USPC .......... 423/213.2, 213.5; 60/299; 502/325, 502/527.12
See application file for complete search history.

(56) References Cited

U.S. PATENT DOCUMENTS

| | | |
|---|---|---|
| 2006/0270550 A1 | 11/2006 | Shimizu et al. |
| 2008/0081761 A1 | 4/2008 | Suzuki |
| 2010/0150792 A1 | 6/2010 | Kitamura et al. |
| 2010/0183490 A1* | 7/2010 | Hoke et al. ............ 423/213.5 |
| 2012/0031085 A1 | 2/2012 | Zhang et al. |
| 2012/0128557 A1* | 5/2012 | Nunan et al. ............ 423/213.5 |

FOREIGN PATENT DOCUMENTS

| | | |
|---|---|---|
| JP | 61-078438 | 4/1986 |
| JP | 5-049929 | 3/1993 |
| JP | 2005-530614 | 10/2005 |
| JP | 2006-075724 | 3/2006 |
| JP | 2006-326428 | 12/2006 |
| JP | 2007-038072 | 2/2007 |
| JP | 2010-005592 | 1/2010 |
| JP | 2012-035206 | 2/2012 |
| JP | 2012-040547 | 3/2012 |
| JP | 2012-152702 | 8/2012 |
| WO | WO 99/55459 | 11/1999 |
| WO | WO 2004/002621 | 1/2004 |
| WO | WO 2006/028028 | 3/2006 |
| WO | WO 2012/101505 | 8/2012 |

* cited by examiner

Primary Examiner — Timothy Vanoy
(74) Attorney, Agent, or Firm — Finnegan, Henderson, Farabow, Garrett & Dunner, LLP

(57) ABSTRACT

An automobile exhaust gas catalytic converter includes a first catalyst layer; a second catalyst layer located on a downstream side as compared to the first catalyst layer; and a base material on which the first catalyst layer and the second catalyst layer are respectively located. In the exhaust gas catalytic converter, the proportion ($L_B/L_S$) of a coating length ($L_B$) of the second catalyst layer from a downstream end of the base material with respect to a total length ($L_S$) of the base material in the exhaust gas flow direction is approximately 50 to 90%, the proportion of an amount of Rh contained in the second catalyst layer with respect to a total amount of Rh contained in the first catalyst layer and the second catalyst layer is approximately 50 to 90% by mass, and the rest of Rh is contained together with Pd or Pt in the first catalyst layer.

1 Claim, 3 Drawing Sheets

AUTOMOBILE EXHAUST GAS CATALYTIC CONVERTER

CROSS-REFERENCE TO RELATED APPLICATIONS

This application is a national phase application of International Application No. PCT/IB2011/002591, filed Nov. 2, 2011, and claims the priority of Japanese Application No. 2010-248233, filed Nov. 5, 2010, the content of both of which is incorporated herein by reference.

BACKGROUND OF THE INVENTION

1. Field of the Invention

The present invention relates to automobile exhaust gas catalytic converter and more particularly to an automobile exhaust gas catalytic converter that has a specific structure of a catalyst layer that includes Rh as a precious metal and the other catalyst layer that includes Rh and Pt or Pd as precious metals to be capable of providing a high $NO_x$ reduction performance under a condition where an air-fuel ratio fluctuates.

2. Description of Related Art

The exhaust gases that are discharged from automobile includes HC, CO, and $NO_x$, and these substances are emitted into the air after converted into non-toxic substances by an exhaust gas catalytic converter. As typical exhaust gas catalytic converter used herein, three-way catalytic converter is widely used in which the precious metals such as platinum (Pt), rhodium (Rh), and palladium (Pd) are supported on porous oxide supports such as alumina ($Al_2O_3$), silica ($SiO_2$), zirconia ($ZrO_2$), and titania ($TiO_2$).

A three-way catalytic converter oxidizes HC and CO and reduces $NO_x$ in the exhaust gases that are discharged to the downstream side of an engine to convert them into non-toxic substances. The three-way catalytic converter is most effective when the catalytic converter receives the exhaust gas in a stoichiometric atmosphere that is burnt in near a theoretical air-fuel ratio. However, improvement of fuel efficiency is highly demanded in recent years, and the exhaust gas catalytic converter is subjected to rapid atmospheric fluctuations such that the number of fuel-cut is increased at high temperature of 1,000° C. in some cases, or the oxidation or the reduction is performed at high temperature based on the fluctuation of the air-fuel ratio. Such the rapid atmospheric fluctuations significantly accelerate catalytic deactivation in which grain growth of precious metal component occurs in the three-way catalytic converter, and thus the performance of the catalytic converter deteriorates.

Among the components of the three-way catalytic converter, Rh is an essential component, and $ZrO_2$ and $Al_2O_3$ are used as a support in order to prevent the grain growth of Rh. In addition, the technique for improving heat resistance of the supports is known. However, an attempt to prevent the grain growth of Rh by improving the heat resistance of the supports exhibits an effect on thermal deterioration but has insufficient effects on the prevention of Rh deterioration due to the atmospheric fluctuation. On the other hand, an attempt to change the structure of the catalyst layer that is formed on the base material is made in order to improve a catalytic performance of the exhaust gas catalytic converter.

For example, Japanese Patent Application Publication No. 2006-326428 (JP-A-2006-326428) describes that an exhaust gas catalytic converter, which has an A-region of a catalyst coating layer on an upstream side which contains Rh only or Rh and a precious metal other than Rh in the proportion of 1:1 by weight and a B-region of the catalyst coating layer on a downstream side which has higher proportion of the precious metal other than Rh, has high $NO_x$ reduction performance at high temperature. In addition, JP-A-2006-326428 describes HC 50% oxidation rate achievement temperature as a specific example. However, the $NO_x$ reduction performance after the catalytic converter is subjected to an endurance test under an air-fuel ratio fluctuating condition is not mentioned in the description.

Published Japanese Translation of PCT application No. 2007-38072 (JP-A-2007-38072) describes an exhaust gas catalytic converter that has a catalyst base material and a catalyst coating layer formed on the catalyst base material, in which the catalyst coating layer has an upstream section that is provided on the upstream side in an exhaust gas flow direction and a downstream section that is provided on the downstream side, and the upstream section has a layer structure that includes an upstream section inner layer and an upstream section outer layer. JP-A-2007-38072 also describes the exhaust gas catalytic converter that uses the combination of Rh and the precious metal other than Rh in the downstream section and that includes only Rh as the precious metal in both the upstream section and the downstream section. However, the $NO_x$ reduction performance after the catalytic converter is subjected to an endurance test under an air-fuel ratio fluctuating condition is not mentioned in the description.

Furthermore, Japanese Patent Application Publication No. 2010-5592 (JP-A-2010-5592) describes an exhaust gas catalytic converter that has an upstream catalyst layer which is thin and contains Pd and a downstream catalyst layer which includes an inner catalyst layer containing Pt on a downstream side and an outer catalyst layer containing Rh, in which the ratio of the thickness of the outer catalyst layer with respect to the thickness of the inner catalyst layer is 1.5 through 2.5. JP-A-2010-5592 also describes specific examples such that Pd and Pt are independently used as the precious metal other than Rh. However, the $NO_x$ reduction performance after the catalytic converter is subjected to an endurance test under an air-fuel ratio fluctuating condition is not mentioned in the description.

That is, the exhaust gas catalytic converters that have been disclosed in the aforementioned JP-A-2006-326428, JP-A-2007-38072, and JP-A-2010-5592 deliver insufficient $NO_x$ reduction performance after the catalytic converters are subjected to the endurance test under the air-fuel ratio fluctuating condition. Therefore, an automobile exhaust gas catalytic converter that has higher $NO_x$ reduction performance than related arts is demanded.

SUMMARY OF THE INVENTION

An object of the present invention is to provide an automobile exhaust gas catalytic converter that can deliver high $NO_x$ reduction performance even under an air-fuel ratio fluctuating condition.

A first aspect of the present invention relates to an automobile exhaust gas catalytic converter including: a first catalyst layer that contains Rh and Pd or Pt as precious metals; a second catalyst layer that is located on a downstream side of the exhaust gas flow direction as compared to the first catalyst layer and contains only Rh as a precious metal; and a base material on which the first catalyst layer and the second catalyst layer are respectively located. In the automobile exhaust gas catalytic converter, the proportion of a coating length of the second catalyst layer from a downstream end of the base material with respect to a total length of the base material in the exhaust gas flow direction is approximately 50 to 90%, the proportion of an amount of Rh that is contained in the second catalyst layer with respect to a total amount of Rh that is contained in the first catalyst layer and the second catalyst layer is approximately 50 to 90% by mass, and the rest of Rh is contained together with Pd or Pt in the first catalyst layer.

In the aforementioned aspect, the proportion of the coating length of the second catalyst layer from the downstream end of the base material with respect to the total length of the base material in the exhaust gas flow direction may be approximately 80%.

In the aforementioned aspect, the proportion of the amount of Rh that is contained in the second catalyst layer with respect to the total amount of Rh that is contained in the first catalyst layer and the second catalyst layer may be approximately 80% by mass.

In the aforementioned aspect, the proportion of a coating length of the first catalyst layer from an upstream end of the base material with respect to the total length of the base material in the exhaust gas flow direction may be approximately 20 to 90%.

In the aforementioned aspect, the proportion of the coating length of the first catalyst layer from the upstream end of the base material with respect to the total length of the base material in the exhaust gas flow direction may be approximately 80%.

In the aforementioned aspect, the proportion of the sum of the coating length of the first catalyst layer and the coating length of the second catalyst layer with respect to the total length of the base material in the exhaust gas flow direction may be greater than 1. In addition, the second catalyst layer may be located on the first catalyst layer in a portion where the first catalyst layer and the second catalyst layer overlap one another.

In the aforementioned aspect, the catalyst compositions of the first catalyst layer may be: Rh=0.06 g/L, Pt=1 g/L, $Al_2O_3$=20 g/L, $ZrO_2$—$CeO_2$=100 g/L. In addition, the catalyst compositions of the second catalyst layer may be: Rh=0.24 g/L, $Al_2O_3$=30 g/L, $ZrO_2$—$CeO_2$=30 g/L.

A second aspect of the present invention relates to a manufacturing method of an automobile exhaust gas catalytic converter. The manufacturing method of the automobile exhaust gas catalytic converter includes: preparing a base material; preparing coating slurry that is obtained by mixing an oxygen release material that supports Rh and Pt or Pd as precious metals, and water and that is applied to a first catalyst layer; preparing coating slurry that is obtained by using an oxygen release material that supports Rh as a precious metal and the same way as preparing the first catalyst layer and that is applied to a second catalyst layer provided on a downstream side of the exhaust gas flow direction as compared to the first catalyst layer; supplying the coating slurry that is applied to the first catalyst layer to the base material from the upstream side of the exhaust gas flow direction of the base material up to a position where the proportion of a coating length of the first catalyst layer with respect to a total length of the base material in the exhaust gas flow direction is approximately 20 to 90% and drying and firing the slurry; and supplying the coating slurry that is applied to the second catalyst layer to the base material from the downstream side of the exhaust gas flow direction up to a position where the proportion of a coating length of the second catalyst layer with respect to a total length of the base material in the exhaust gas flow direction is approximately 50 to 90% and drying and firing the slurry.

In the aforementioned aspect, the coating slurry that is applied to the first catalyst layer and the coating slurry that is applied to the second catalyst layer may further be mixed with a support base material and a binder.

In the aforementioned aspect, the coating slurry that is applied to the first catalyst layer and the coating slurry that is applied to the second catalyst layer may be supplied to the base material so that the proportion of an amount of Rh that is contained in the second catalyst layer with respect to a total amount of Rh that is contained in the first catalyst layer and the second catalyst layer is approximately 50 to 90% by mass. In addition, the coating slurry that is applied to the first catalyst layer may be supplied to the base material so that the rest of Rh is contained together with Pd or Pt in the first catalyst layer.

In the aforementioned aspect, the coating slurry that is applied to the first catalyst layer and the coating slurry that is applied to the second catalyst layer may be supplied to the base material so that proportion of the sum of the coating length of the first catalyst layer and the coating length of the second catalyst layer with respect to the total length of the base material in the exhaust gas flow direction is greater than 1. In addition, the coating slurry that is applied to the first catalyst layer and the coating slurry that is applied to the second catalyst layer may be supplied to the base material so that the second catalyst layer is located on the first catalyst layer in a portion where the first catalyst layer and the second catalyst layer overlap one another.

According to the aforementioned aspects, the automobile exhaust gas catalytic converter that can deliver high $NO_x$ reduction performance even after the endurance test under an air-fuel ratio fluctuating condition can be obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
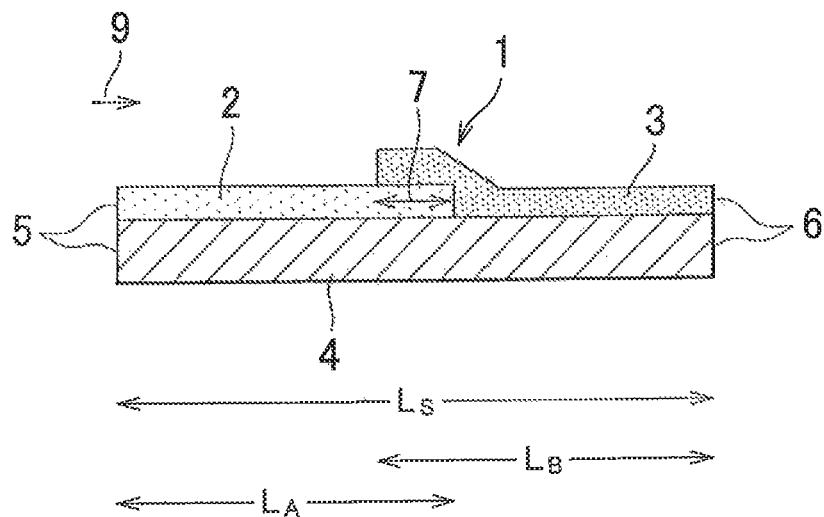
FIG. 1 is a partially enlarged cross-sectional schematic view of the automobile exhaust gas catalytic converter according to an embodiment of the present invention.

As shown in FIG. 1, an automobile exhaust gas catalytic converter 1 according to an embodiment of the present invention includes a first catalyst layer 2 that is located on an upstream side of an exhaust gas flow direction 9 and contains Rh and Pd or Pt as precious metals, a second catalyst layer 3 that is located on a downstream side of the exhaust gas flow direction 9 and contains only Rh as the precious metals, and a base material 4 on which the first catalyst layer and the second catalyst layer are respectively located. In the automobile exhaust gas catalytic converter 1, the proportion of a coating length $L_B$ of the second catalyst layer 3 from a downstream end 6 of the base material 4 with respect to a total length $L_S$ of the base material 4 in the exhaust gas flow direction (hereinafter referred to as $L_B/L_S$) is approximately 50 to 90%, the proportion of the amount of Rh that is contained in the second catalyst layer 3 with respect to the total amount of Rh that is contained in the first catalyst layer 2 and the second catalyst layer 3 is approximately 50 to 90% by mass, and the rest of Rh is contained together with Pd or Pt in the first catalyst layer 2.

By using the automobile exhaust gas catalytic converter according to the embodiment described above, as shown in FIGS. 3 and 4, $NO_x$ 50% reduction temperature after the endurance test under the air-fuel ratio fluctuating condition, which is obtained from a measurement method described in detail later in an Example section, can be lower than 350° C.

In this embodiment, the proportion of the coating length $L_A$ of the first catalyst layer 2 from the upstream end 5 of the base material 4 with respect to the total length $L_S$ of the base material 4 in the exhaust gas flow direction (hereinafter referred to as $L_A/L_S$) is approximately 20 to 90%.

In this embodiment, the proportion of the sum of the coating length $L_A$ of the first catalyst layer 2 and the coating length $L_B$ of the second catalyst layer 3 ($L_A+L_B$) with respect to the total length $L_S$ of the base material 4 in the exhaust gas flow direction [($L_A+L_B$)/$L_S$] is greater than 1, and the second catalyst layer 3 is located on the first catalyst layer 2 in a portion 7 where the first catalyst layer 2 and the second catalyst layer 3 overlap one another.

By using the automobile exhaust gas catalytic converter according to the embodiment described above, as shown in FIG. 5, the $NO_x$ 50% reduction temperature can be lower than 340° C.

Figure 2:
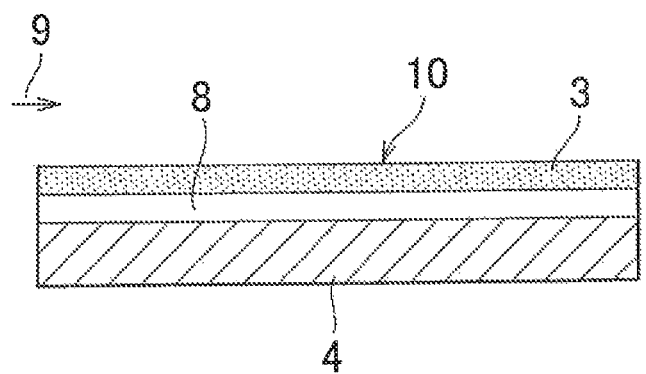
FIG. 2 is a partially enlarged cross-sectional schematic view of the automobile exhaust gas catalytic converter of the related art.

Contrarily, the automobile exhaust gas catalytic converter 10 that is commonly used as shown in FIG. 2 is provided with the second catalyst layer 8 that is located on the base material 4 and contains Pd or Pt as the precious metal and the second catalyst layer 3 that is further located on the entire region of the second catalyst layer 8 and contains only Rh.

Figure 3:
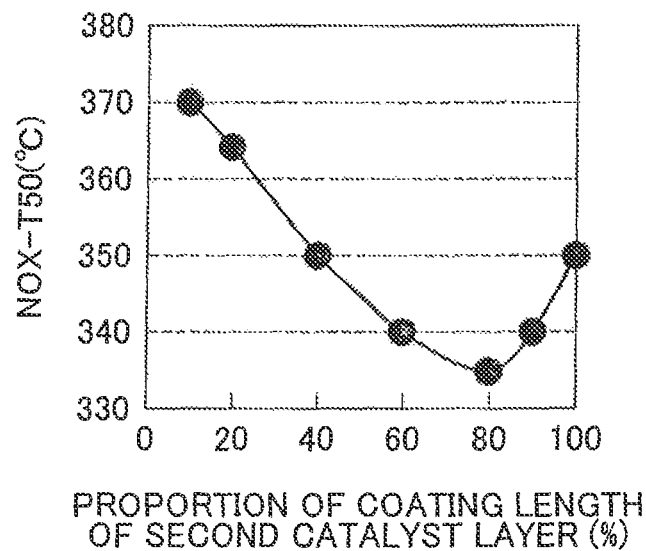
FIG. 3 is a graph that shows a relation between $NO_x$ reduction rate after an endurance test under an air-fuel ratio fluctuating condition and $L_B/L_S$ by using automobile exhaust gas catalytic converters that are obtained in Examples 1 through 3 and Comparative Examples 1 through 4.
Figure 4:
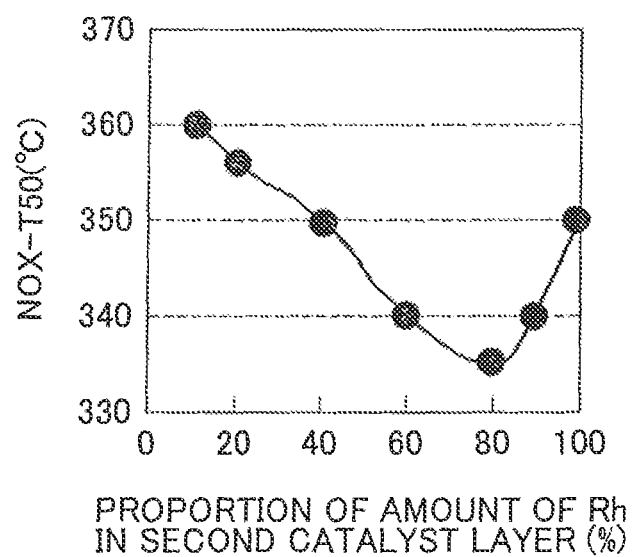
FIG. 4 is a graph that shows a relation between $NO_x$ reduction rate after the endurance test under the air-fuel ratio fluctuating condition and proportion of the amount of Rh contained in a second catalyst layer with respect to the total amount of Rh contained in a first catalyst layer and the second catalyst layer by using automobile exhaust gas catalytic converters that are obtained in Examples 4 through 6 and Comparative Examples 5 through 8.

If $L_B/L_S$ is out of the range of approximately 50 to 90%, then the $NO_x$ 50% reduction temperature reaches 350° C. or higher as shown in FIG. 3. Furthermore, if the proportion of the amount of Rh that is contained in the second catalyst layer 3 with respect to the total amount of Rh that is contained in the first catalyst layer 2 and the second catalyst layer 3 is out of the range of approximately 50 to 90% by mass, then the $NO_x$ 50% reduction temperature reaches 350° C. or higher as shown in FIG. 4.

The automobile exhaust gas catalytic converter 1 according to the embodiment of the present invention is capable of accelerating oxygen adsorption reaction of the first catalyst layer 2 and particularly relaxing the atmospheric fluctuation, to which the most active Rh in the second catalyst layer 3 is subjected, to prevent the deterioration of Rh. Furthermore, the automobile exhaust gas catalytic converter 1 is considered to be capable of preventing catalyst sintering through alloy formation of Pd—Rh or Pt—Rh when Rh is contained together with Pd or Pt in the first catalyst layer 2. The alloy formation of Pd—Rh or Pt—Rh described above is considered to occur when the catalyst layer is heated to the temperature of about 1,000° C.

The base material 4 described above includes ceramic materials such as cordierite and metal base materials such as stainless steel. The shape of the base material 4 described above is not limited and includes a straight flow type, a filter type, and other shapes. The automobile exhaust gas catalytic converter 1 according to the embodiment of the present invention is generally formed on a flow passage wall that forms a gas flow passage in which exhaust gas flows.

The first catalyst layer 2 in the embodiment of the present invention includes Rh and Pd or Pt as precious metals and generally includes an oxygen release material, which supports the precious metals, and furthermore a support base material. The second catalyst layer 3 in the embodiment of the present invention includes only Rh as the precious metal and generally includes an oxygen release material, which supports the precious metal, and furthermore a support base material.

The oxygen release material includes oxides that contain cerium (Ce). The oxides that contain Ce include ceria ($CeO_2$). The ceria ($CeO_2$) can be used as complex oxides such as a ceria-zirconia ($CeO_2$—$ZrO_2$) complex oxide (CZ). In addition, the aforementioned ceria complex oxide includes secondary particles of solid solution that consist of three elements of Ce, Zr, and O and secondary particles of solid solution that consist of four or more elements of the aforementioned three elements plus rare earth elements such as Y and Nd. The support base material includes at least one of $Al_2O_3$, $SiO_2$, $TiO_2$, and $ZrO_2$. The aforementioned precious metals may generally support the amount of 0.01 g/L or greater in a catalyst layer and particularly 0.01 through 2 g/L in a catalyst layer. Furthermore, the first catalyst layer 2 and the second catalyst layer 3 may include an alumina binder as the binder.

A manufacturing method of the automobile exhaust gas catalytic converter 1 according to the present invention may include: a step of preparing the base material 4 such as a honeycomb base material; a step of preparing coating slurry that is obtained by mixing the oxygen release material that supports Rh and Pt or Pd as the precious metals, the support base material such as $Al_2O_3$ in some case, and then the binder such as an alumina binder in a given proportion and adding water and that is applied to the first catalyst layer 2 provided on the upstream side of the exhaust gas flow direction 9, and coating slurry that is obtained by using the oxygen release material that supports Rh as the precious metal and using the same way as the preparation of the first catalyst layer 2 and that is applied to the second catalyst layer 3 provided on the downstream side of the exhaust gas flow direction 9; a step of supplying the coating slurry that is applied to the first catalyst layer 2 from an opening that is expected to be on the upstream side of the exhaust gas flow direction 9 of the base material 4 such as the honeycomb base material to a specified length in the longitudinal direction of the base material 4 and drying and firing the slurry; and a step of supplying the coating slurry that is applied to the second catalyst layer 3 from an opening that is expected to be on the downstream side of the exhaust gas flow direction 9 to a specified length in the longitudinal direction of the base material 4 and drying and firing the slurry.

The automobile exhaust gas catalytic converter 1 according to the embodiment of the present invention has high $NO_x$ reduction performance. The automobile exhaust gas catalytic converter 1 according to the embodiment may be used in combination with a member that has the other functions such as a particulate filter.

Hereinafter, examples of the present invention will be described with comparative examples. The following examples are intended to be merely illustrative and not intended to limit the present invention. In each of the following examples, the $NO_x$ 50% reduction temperature of the automobile exhaust gas catalytic converter is determined according to the endurance test and a catalyst evaluation method that are described below. However, it is apparent that the endurance test and the catalyst evaluation method for the automobile exhaust gas catalytic converter are not limited to the following methods but conducted in the similar manner in accordance with the method in which a person skilled in the art considers that they are equivalent.

The endurance test conditions are as follows: endurance temperature and time=950° C.×50 hours; endurance environment=air-fuel ratio of 14.6 (50 sec.)+fuel cut (5 sec.)+air-fuel ratio of 13.5 (5 sec.)=total of 60 sec. cycle. The $NO_x$ reduction performance evaluation method of the catalyst after the aforementioned endurance test is conducted to obtain the $NO_x$ 50% reduction temperature (indicated as NOX-T50 in the graphs) by fixing an incoming air-fuel ratio to 14.6, raising the temperature from 100° C. at a rate of 10° C./min., and measuring the $NO_x$ reduction rate.

In Examples 1 through 3, the automobile exhaust gas catalytic converters were obtained by fixing components that were contained in the first catalyst layer and the second catalyst layer in composition described below, fixing $L_A/L_S$ to 80%, and changing $L_B/L_S$ to 60% (Example 1), 80% (Example 2), and 90% (Example 3) to form the catalyst coating layers on a ceramic honeycomb (rectangular cell, 3.5 mil/600 cpsi, 103 mm dia.×105 mm length).

The catalyst compositions of the first catalyst layer were: Rh=0.06 g/L, Pt=1 g/L, $Al_2O_3$=20 g/L, $ZrO_2$—$CeO_2$=100 g/L. The catalyst compositions of the second catalyst layer were: Rh=0.24 g/L, $Al_2O_3$=30 g/L, $ZrO_2$—$CeO_2$=30 g/L.

On the other hand, in Comparative Examples 1 through 4, the automobile exhaust gas catalytic converters were obtained by the similar manner to Example 1, except that $L_B/L_S$ is changed to 10% (Comparative Example 1), 20% (Comparative Example 2), 40% (Comparative Example 3), and 100% (Comparative Example 4), to form the catalyst coating layers.

The results of the $NO_x$ reduction performance evaluation after the endurance test by using the catalysts that are obtained in Example 1 through 3 and Comparative Examples 1 through 4 are shown in FIG. 3.

From FIG. 3, it can be found that $NO_x$ 50% reduction temperature is below 350° C. within the range of 50 to 90% of $L_A/L_S$, and the automobile exhaust gas catalytic converter that is obtained by setting $L_A/L_S$ to 80% and $L_B/L_S$ to 80% to form the catalyst coating layer exhibits the most favorable $NO_x$ reduction performance.

In Examples 4 through 6, the automobile exhaust gas catalytic converters were obtained by representing the amount of Rh contained in the second catalyst layer with X g/L as follows, representing the amount of Rh contained in the first catalyst layer with (0.3−X) g/L, changing the proportion of Rh contained in the second catalyst layer with respect to the total amount of Rh to 60% (Example 4), 80% (Example 5), or 90% (Example 6), fixing other components in composition described below, fixing $L_A/L_S$ to 80%, and fixing $L_B/L_S$ to a constant value of 80% to form the catalyst coating layers on a ceramic honeycomb (rectangular cell, 3.5 mil/600 cpsi, 103 mm dia.×105 mm length).

The catalyst compositions of the first catalyst layer were: Rh=(0.3−X) g/L, Pt=1 g/L, $Al_2O_3$=20 g/L, $ZrO_2$—$CeO_2$=100 g/L. The catalyst compositions of the second catalyst layer were: Rh=X g/L, $Al_2O_3$=30 g/L, $ZrO_2$—$CeO_2$=30 g/L.

On the other hand, in Comparative Examples 5 through 8, the automobile exhaust gas catalytic converters were obtained by the similar manner to Example 4, except that the amount of Rh contained in the second catalyst layer is represented with X g/L, the amount of Rh contained in the first catalyst layer is represented with (0.3−X) g/L, the proportion of Rh contained in the second catalyst layer with respect to the total amount of Rh is changed to 10% (Comparative Example 5), 20% (Comparative Example 6), 40% (Comparative Example 7), and 100% (Comparative Example 8) to form the catalyst coating layers.

The results of the $NO_x$ reduction performance evaluation after the endurance test by using the catalysts that are obtained in Example 4 through 6 and Comparative Examples 5 through 8 are shown in FIG. 4.

From FIG. 4, it can be found that $NO_x$ 50% reduction temperature is below 350° C. within the range where the proportion of Rh contained in the second catalyst layer with respect to the total amount of Rh is 50 to 90%, and the automobile exhaust gas catalytic converter that is obtained by setting $L_A/L_S$ to 80%, $L_B/L_S$ to 80%, and the proportion of Rh contained in the second catalyst layer with respect to the total amount of Rh to 80% to form the catalyst coating layer exhibits the most favorable $NO_x$ reduction performance.

In Examples 7 through 11, the automobile exhaust gas catalytic converters were obtained by fixing the proportion of Rh contained in the second catalyst layer with respect to the total amount of Rh to a constant value of 80%, fixing the other components to the composition described below, changing $L_A/L_S$ to 20% (Example 7), 40% (Example 8), 60% (Example 9), 80% (Example 10), and 90% (Example 11), and fixing $L_B/L_S$ to a constant value of 80% to form the catalyst coating layers on a ceramic honeycomb (rectangular cell, 3.5 mil/600 cpsi, 103 mm dia.×105 mm length).

The catalyst compositions of the first catalyst layer were: Rh=0.06 g/L, Pt=1 g/L, $Al_2O_3$=20 g/L, $ZrO_2$—$CeO_2$=100 g/L. The catalyst compositions of the second catalyst layer were: Rh=0.24 g/L, $Al_2O_3$=30 g/L, $ZrO_2$—$CeO_2$=30 g/L.

On the other hand, in Comparative Examples 9 through 10, the automobile exhaust gas catalytic converters were obtained by the similar manner to Example 7, except that $L_A/L_S$ is changed to 10% (Comparative Example 9) or 100% (Comparative Example 10), to form the catalyst coating layers.

Figure 5:
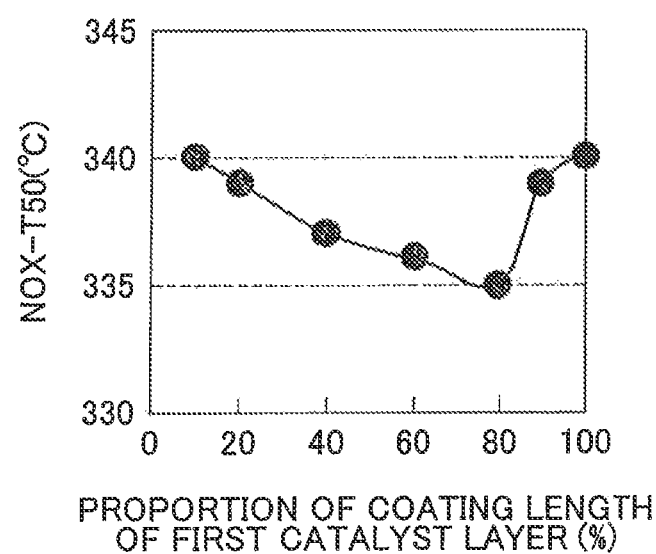
FIG. 5 is a graph that shows a relation between $NO_x$ reduction rate after the endurance test under the air-fuel ratio fluctuating condition and $L_A/L_S$ by using automobile exhaust gas catalytic converters that are obtained in Examples 7 through 11 and Comparative Examples 9 through 10.

The results of the $NO_x$ reduction performance evaluation after the endurance test by using the catalysts that are obtained in Example 7 through 11 and Comparative Examples 9 through 10 are shown in FIG. 5.

From FIG. 5, the automobile exhaust gas catalytic converters that are obtained through the formation of the catalyst coating layers within the range where $L_A/L_S$ is 20 to 90% exhibit the $NO_x$ 50% reduction temperature of below 340° C. when $L_B/L_S$ is set to 80% and the proportion of Rh contained in the second catalyst layer with respect to the total amount of Rh is set to the constant value of 80%. The automobile exhaust gas catalytic converter that is obtained by setting $L_A/L_S$ to 80% to form the catalyst coating layer exhibits the most favorable $NO_x$ reduction performance.

According to the present invention, the automobile exhaust gas catalytic converter, which can relax the air-fuel ratio fluctuation and prevent the Rh deterioration to deliver high $NO_x$ reduction performance, can be obtained.

The invention claimed is:

1. An automobile exhaust gas catalytic converter, comprising:
 a base material;
 a first catalyst layer that contains Rh and Pd or Pt as precious metals; and
 a second catalyst layer that contains only Rh as a precious metal;
 wherein the first catalyst layer and the second catalyst layer are located on an upstream side and a downstream side in an exhaust gas flow direction, respectively on the base material;
 a first proportion of a coating length of the second catalyst layer from a downstream end of the base material with respect to a total length of the base material in the exhaust gas flow direction is 50 to 90% and a proportion of an amount of Rh that is contained in the second catalyst layer with respect to a total amount of Rh that is contained in the first catalyst layer and the second catalyst layer is 50 to 90% by mass;
 rest of Rh is contained together with Pd or Pt in the first catalyst layer;
 a second proportion of a coating length of the first catalyst layer from an upstream end with respect to the total length of the base material is 20 to 90%;
 a third proportion of a sum of the coating length of the first catalyst layer and the coating length of the second catalyst layer with respect to the total length of the base material is greater than 1; and
 the second catalyst layer is located on the first catalyst layer in a portion where the first catalyst layer and the second catalyst layer overlap one another.

* * * * *